(12) United States Patent
Elias et al.

(10) Patent No.: US 10,239,713 B2
(45) Date of Patent: Mar. 26, 2019

(54) LOW PROFILE DRIVE-OVER CONVEYOR WITH FLEXIBLE FRAMEWORK, BELT CLEANOUT SECTION AND LIFTLESS SWING POSITIONING

(71) Applicant: Soaring Eagle Grain Equipment Inc., Winkler (CA)

(72) Inventors: Henry Elias, Winkler (CA); Tim Penner, Winkler (CA)

(73) Assignee: Soaring Eagle Grain Equipment Inc., Winkler (CA)

( * ) Notice: Subject to any disclaimer, the term of this patent is extended or adjusted under 35 U.S.C. 154(b) by 0 days.

(21) Appl. No.: 15/827,558

(22) Filed: Nov. 30, 2017

(65) Prior Publication Data

US 2019/0016547 A1    Jan. 17, 2019

(51) Int. Cl.
| | | |
|---|---|---|
| *B65G 37/00* | (2006.01) | |
| *B65G 41/00* | (2006.01) | |
| *B65G 47/18* | (2006.01) | |
| *B65G 67/24* | (2006.01) | |

(52) U.S. Cl.
CPC ............ *B65G 67/24* (2013.01); *B65G 37/005* (2013.01); *B65G 41/008* (2013.01); *B65G 47/18* (2013.01); *B65G 2201/042* (2013.01); *B65G 2814/0326* (2013.01)

(58) Field of Classification Search
CPC .. B65G 41/002; B65G 41/008; B65G 17/126; B65G 47/16; B65G 47/52; B65G 33/14; B65G 15/00; B65G 15/30; B66F 3/22; B60P 1/433

USPC ........ 198/300, 311; 414/347, 353, 376, 389, 414/393, 574
See application file for complete search history.

(56) References Cited

U.S. PATENT DOCUMENTS

| | | | | |
|---|---|---|---|---|
| 6,966,740 | B2 * | 11/2005 | Mast ...................... | B65G 47/18 414/537 |
| 8,011,490 | B2 * | 9/2011 | Gausman ............... | B65G 67/24 198/311 |
| 9,663,303 | B2 * | 5/2017 | Waldner ............... | B65G 41/002 |
| 9,840,381 | B1 * | 12/2017 | Carteri ................. | B65G 69/28 |
| 9,884,731 | B2 * | 2/2018 | Wilcox ................ | B65G 41/008 |
| 2005/0123385 | A1 * | 6/2005 | Kirsch ................... | B65G 47/18 414/573 |

(Continued)

*Primary Examiner* — James R Bidwell
(74) *Attorney, Agent, or Firm* — Kyle R Satterthwaite; Ryan W Dupuis; Ade & Company Inc.

(57) ABSTRACT

A drive-over conveyor for receiving material from a bottom-discharge material transport vehicle features a belt conveyor spanning a loading section, a transition section feeding into a secondary conveyor, and a cleanout section for clearing debris that may collect the space between upper and lower runs of the belt. At the cleanout section, the belt is entrained about one or more augers that convey such debris laterally outward from between the belt runs. The loading section features a low-profile framework of resiliently flexible beams that is normally carried in slightly spaced relation above the ground by ground wheels of the section, and that temporarily flexes downward when the vehicle is driven over. Accordingly, the loading section can be wheeled between different positions without any lifting, enabling quick and convenient repositioning of the loading section between different outlets of a parked stationary vehicle, and the need for dedicated drive-over ramps is avoided.

12 Claims, 11 Drawing Sheets

(56) References Cited

U.S. PATENT DOCUMENTS

2015/0078878 A1\* 3/2015 Wilcox ................ B65G 41/002
　　　　　　　　　　　　　　　　　　　　　　　　414/809
2017/0334654 A1\* 11/2017 Friesen .................. B65G 21/14

\* cited by examiner

LOW PROFILE DRIVE-OVER CONVEYOR WITH FLEXIBLE FRAMEWORK, BELT CLEANOUT SECTION AND LIFTLESS SWING POSITIONING

CROSS-REFERENCE TO RELATED APPLICATIONS

This application claims foreign priority benefit under 35 U.S.C. 119(a) of Canadian Patent Application No. 2,973,236, filed Jul. 13, 2017.

FIELD OF THE INVENTION

The present invention relates generally to equipment for handling grain or other bulk material, and more specifically to drive-over conveyors for transferring such granular material out from under bottom-discharge transport vehicles.

BACKGROUND

It is known in the prior art to use a drive-over hopper with a conveyor belt or auger therein to receive grain or other granular material from the outlet of a belly-dump grain truck or trailer, or other bottom-discharge vehicle, and use this first conveyor or auger to convey the material laterally outward from beneath the vehicle, and into a inclined auger or conveyor that conveys the material further onward to an elevated target location, such as the top opening of a storage bin.

Examples of prior drive-over hopper designs used for grain handling in the agricultural industry include the Pit-Stop™ drive-over belt conveyor by Batco Manufacturing, the Gulp™ drive-over belt conveyor by Wesfield industries, the GrainDeck™ drive-over belt conveyor by Brandt Agricultural Products Ltd., and the Pit Express™ drive-over auger conveyor by Mast Productions Inc.

The GrainDeck™ and PitStop™ products are defined separately of the main auger that conveys the grain to its elevated target destination, thus needing to be transported and powered independently of the main auger. The Gulp™ has the advantage of being attached to the swing tube of the main auger, and foldable into a stowed position alongside same for convenient transport as a single unit.

However, there remains room for further improvement.

For example, the prior art involves lifting and lowering of the drive-over hopper into and out of a ground-seated position placing a robust, thick-profile, rigid frame of the hopper on the ground in order to bear the weight of the vehicle when driven thereover. The hopper remains stationary in this ground level parked position, and the vehicle is maneuvered relative to the stationary hopper to properly align the outlet of the vehicle over the hopper. Unloading of multi-outlet vehicles thus requires maneuvering of the vehicle relative to the stationary drive-over hopper between unloading steps in order to properly align the drive-over hopper below the appropriate outlet of the vehicle. It would be desirable to simplify the process of obtaining proper alignment between the vehicle and drive-over hopper by enabling convenient movement of the drive-over hopper relative to a parked position of the vehicle.

Another problem faced not only by drive-over conveyor belts, but also by conveyor belts used in other contexts, is that the pieces of the granular material or other debris can get into the space between the top and bottom runs of the belt, and then become crushed between the belt and the rollers. Over time, such material can build up on the rollers and/or the belt, and have detrimental effects.

Accordingly, it is desirable to provide a new and improved conveyor designs that overcome or mitigate the forgoing shortcomings in the prior art.

SUMMARY OF THE INVENTION

According to one aspect of the invention, there is provided a conveyor belt system comprising a belt conveyor entrained about at least one cleanout auger lying transverse thereto, whereby during driven operation of the belt conveyor rotation of the cleanout auger transversely displaces debris outwardly from a space between top and bottom runs of the belt conveyor.

In one embodiment, the conveyor belt system is incorporated into a drive-over conveyor system that comprises:

a loading section for receiving material, said loading section having a proximal end and a distal end lying opposite thereto in a longitudinal direction; and a transition section having one end connected to the loading section at the proximal end thereof, and another end connected or connectable to a secondary conveyor;

wherein the belt conveyor spans the longitudinal direction of the loading section and reaches therefrom into the transition section, and is driveable in a working direction by which material dumped onto the belt conveyor at the loading section is conveyed longitudinally onward into the transition section for entry to the secondary conveyor.

Preferably the cleanout auger resides at or adjacent an inclined section of the belt conveyor.

Preferably the cleanout auger resides at or adjacent a bottom end of said inclined section of the belt conveyor.

Preferably the at least one cleanout auger comprises another cleanout auger located at an upper end of the inclined section of the belt conveyor, and around which said belt conveyor is wrapped to change a travel direction of the belt conveyor between the top and bottom runs thereof.

Preferably the drive-over conveyor system comprises a cleanout section connected to the loading section at the distal end thereof; and the cleanout auger is located at said cleanout section.

Preferably the cleanout section is inclined to slope upwardly from the loading section.

Preferably there is open space at an underside of the cleanout section to allow the debris to fall therefrom once transversely cleared from between the top and bottom runs of the belt conveyor.

Preferably a frame of the loading section comprises flexible beams lying in the longitudinal on opposing sides of the belt conveyor to allow downward flexing thereof when a vehicle drives over said loading section.

Preferably the loading section is supported in a normally elevated state, and the flexible beams enable downward deflection thereof when the vehicle drives over said loading section.

Preferably the flexible beams comprise resiliently flexible material that returns said beams to a normal state after temporary flexing thereof by the vehicle.

Preferably said flexible beams comprise spring steel.

Preferably there are raisable and lowerable hopper walls pivotal on the loading section between a raised positions angling upwardly from opposite sides the belt conveyor at the loading section in a diverging manner, and lowered positions sloping downwardly from the opposite sides of the belt conveyor toward ground level.

Preferably the loading section is free of any drive-over ramps other than sloped upper surfaces of the hopper walls in the lowered position.

Preferably, within the loading section, the belt conveyor is free of any rollers.

Preferably a permanently attached ground wheel mount is situated proximate the distal end of the loading section and rotatably supports a respective ground wheel that carries said distal of the loading section.

Preferably the ground wheel carries said distal end of the loading section in an elevated state above ground level at all times.

According to a second aspect of the invention, there is provided a drive-over conveyor belt system comprising:

a loading section for receiving material, said loading section having a proximal end and a distal end lying opposite thereto in a longitudinal direction;

a belt conveyor spanning in the longitudinal direction of the loading section; and a set of ground wheels carrying said loading section in a slightly elevated state;

wherein a frame of the loading section comprises flexible beams lying in the longitudinal on opposing sides of the belt conveyor to allow downward flexing thereof when a vehicle drives over said loading section.

Preferably the set of ground wheels support said loading section only from the proximal and distal ends thereof.

According to a third aspect of the invention there is provided a drive-over conveyor belt system comprising:

a loading section for receiving material, said loading section having a proximal end and a distal end lying opposite thereto in a longitudinal direction;

a belt conveyor spanning in the longitudinal direction of the loading section; and raisable and lowerable hopper walls pivotal on the loading section between a raised positions angling upwardly from opposite sides the belt conveyor at the loading section in a diverging manner, and lowered positions sloping downwardly from the opposite sides of the belt conveyor to ground level;

wherein the loading section is free of any drive-over ramps other than sloped upper surfaces of the hopper walls in the lowered position.

According to a fourth aspect of the invention there is provided a drive-over conveyor belt system comprising:

a loading section for receiving material, said loading section having a proximal end and a distal end lying opposite thereto in a longitudinal direction;

a set of permanently attached ground wheel mounts fixed to the loading section at or adjacent the proximal and distal ends thereof to support said loading section in a suspended state between a set of ground wheels installed on said permanently attached ground wheel mounts.

Preferably there is a transition section having one end connected to the loading section at the proximal end thereof, and another end connected or connectable to a secondary conveyor.

According to a fifth aspect of the invention there is provided a method of using a drive-over conveyor comprising:

transitioning said drive-over conveyor between first and second parked positions without lifting a loading section of said drive-over conveyor during said transition.

The first and second parked position may reside respectively beneath first and second outlets of a multi-outlet bottom-discharge vehicle, with the transition being performed after receiving and conveying of a first load of material on a belt conveyor of said loading section of the drive-over conveyor from a first outlet of the bottom-discharge vehicle.

Preferably the loading section of said drive-over conveyor is slightly elevated from the ground in both of the parked positions, and during the transition therebetween.

The method may include, before performing said transition, allowing the bottom-discharge vehicle to drive over the loading section of the drive-over conveyor, during which the loading section flexes downwardly toward ground level beneath a weight of said bottom-discharge vehicle.

The method preferably includes using a resiliency of the loading section to return the loading section to a normal unflexed state spaced above ground level once wheels of the bottom-discharge vehicle have cleared said loading section.

According to a sixth aspect of the invention there is provided a method of using a drive-over conveyor comprising:

with said drive-over conveyor in a parked position suspending a loading section of said drive-over conveyor in a slightly elevated state above ground level, allowing a bottom-discharge vehicle to drive over the loading section, during which the loading section flexes downwardly toward ground level beneath a weight of said bottom-discharge vehicle.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
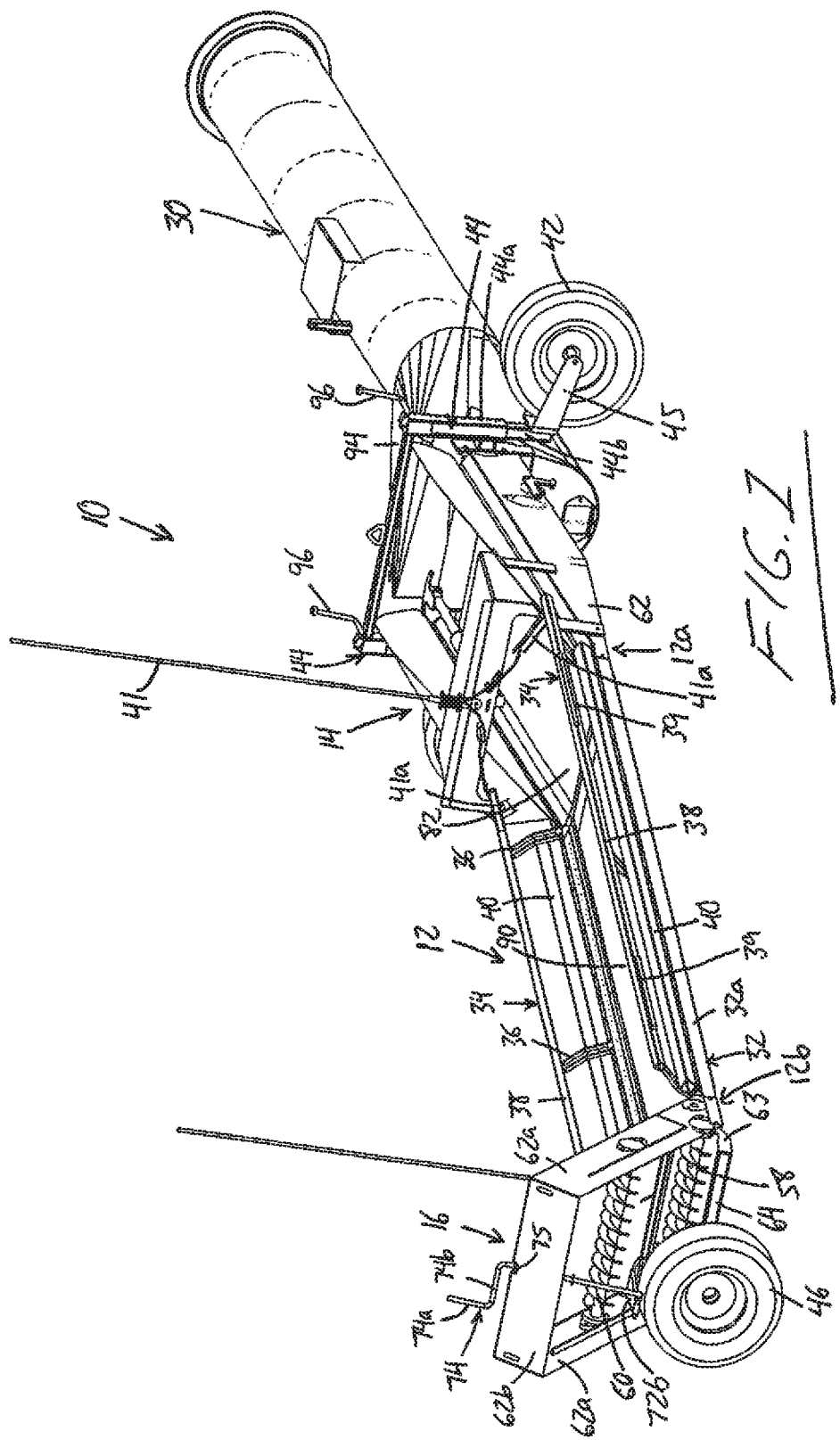
FIG. 1 is a rear side perspective view of a drive-over conveyor of the present invention in a load-ready state with hopper side walls thereof in a raised position, but with a belt of the conveyor omitted for illustrative purpose.
Figure 2:
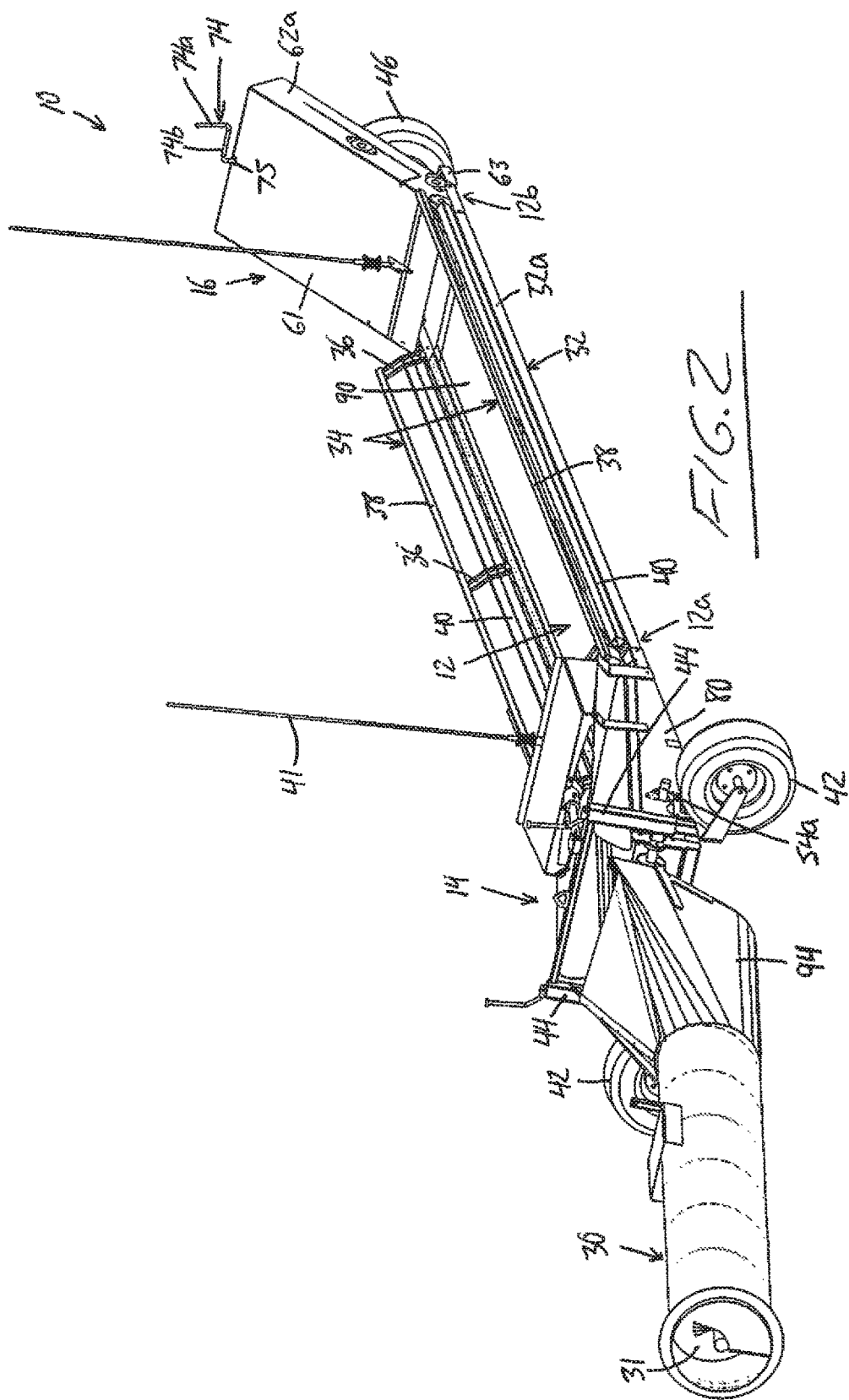
FIG. 2 is a front side perspective view of the drive-over conveyor of FIG. 1.
Figure 3:
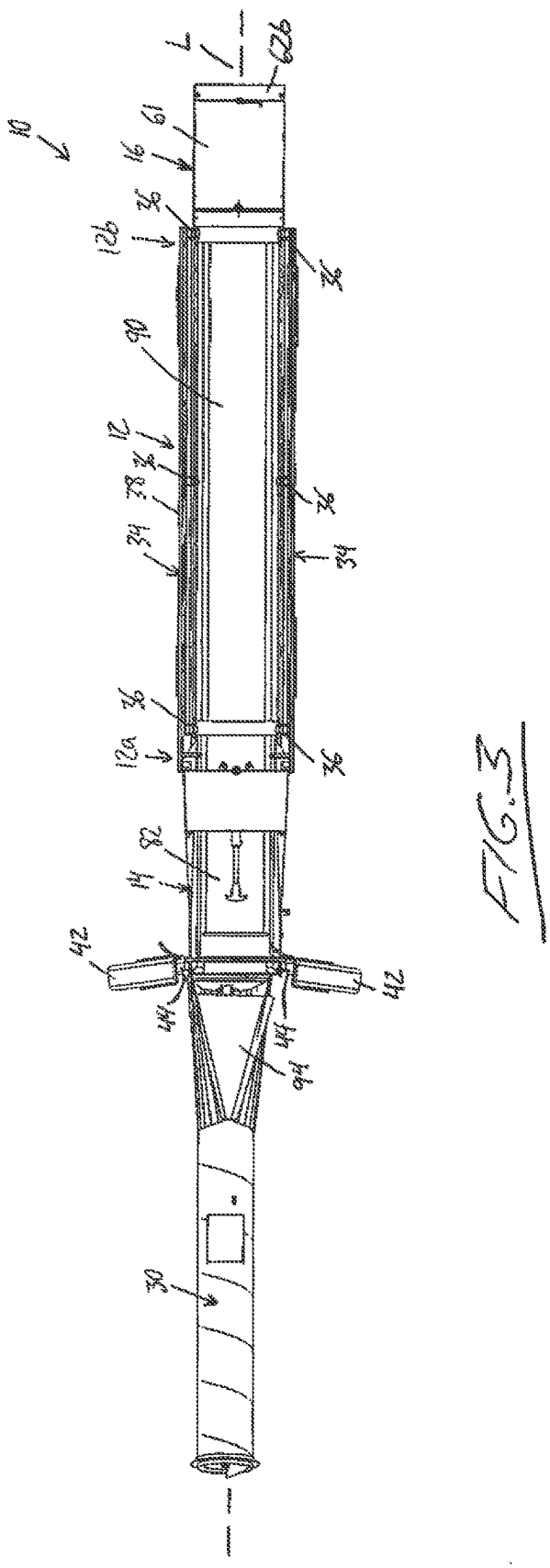
FIG. 3 is a top plan view of the drive-over conveyor of FIG. 1.
Figure 4:
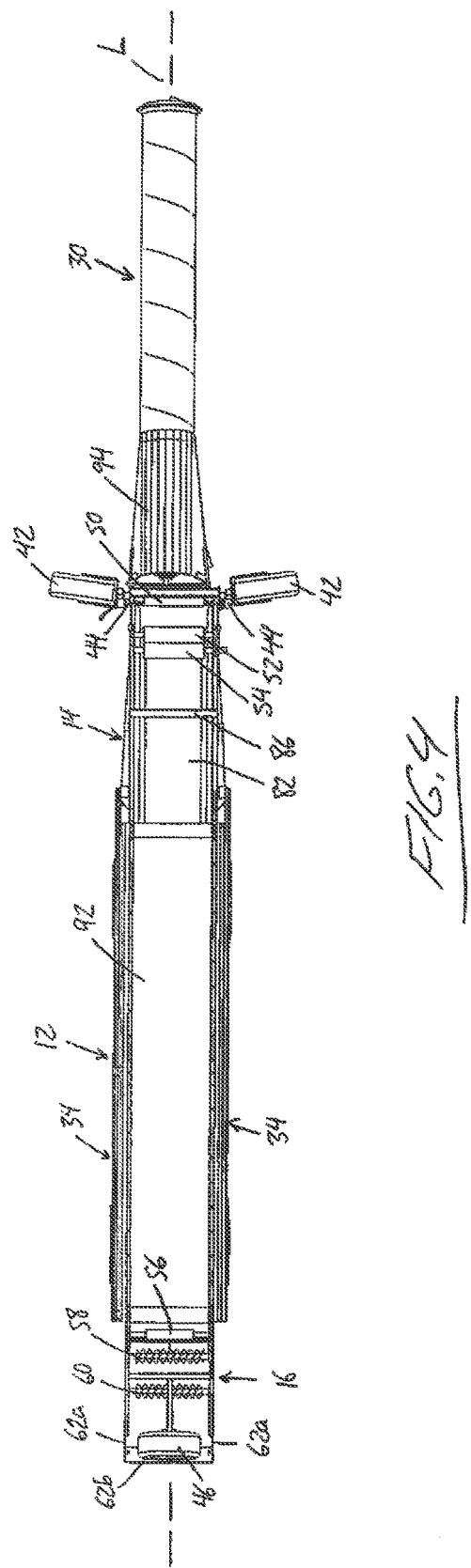
FIG. 4 is a bottom plan view of the drive-over conveyor of FIG. 1.
Figure 5:
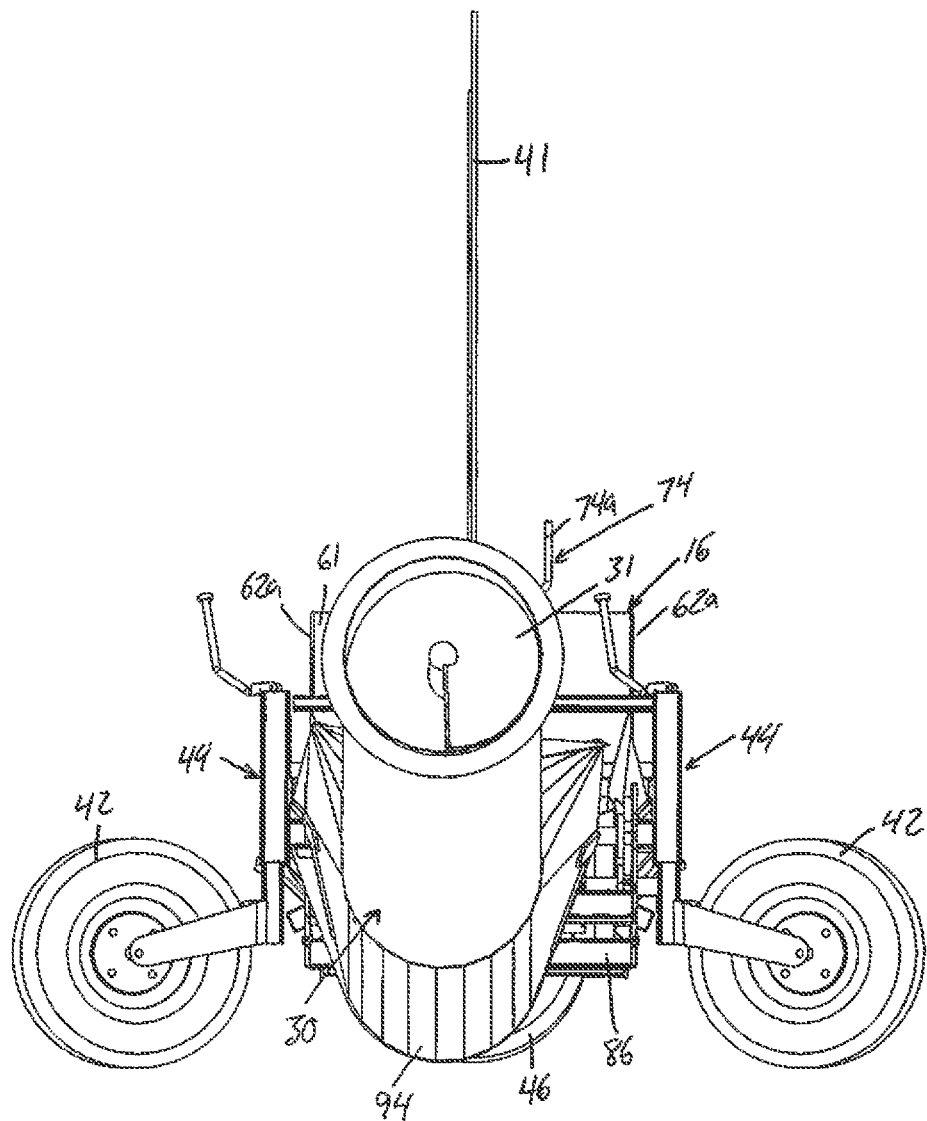
FIG. 5 is a front elevational view of the drive-over conveyor of FIG. 1.
Figure 6:
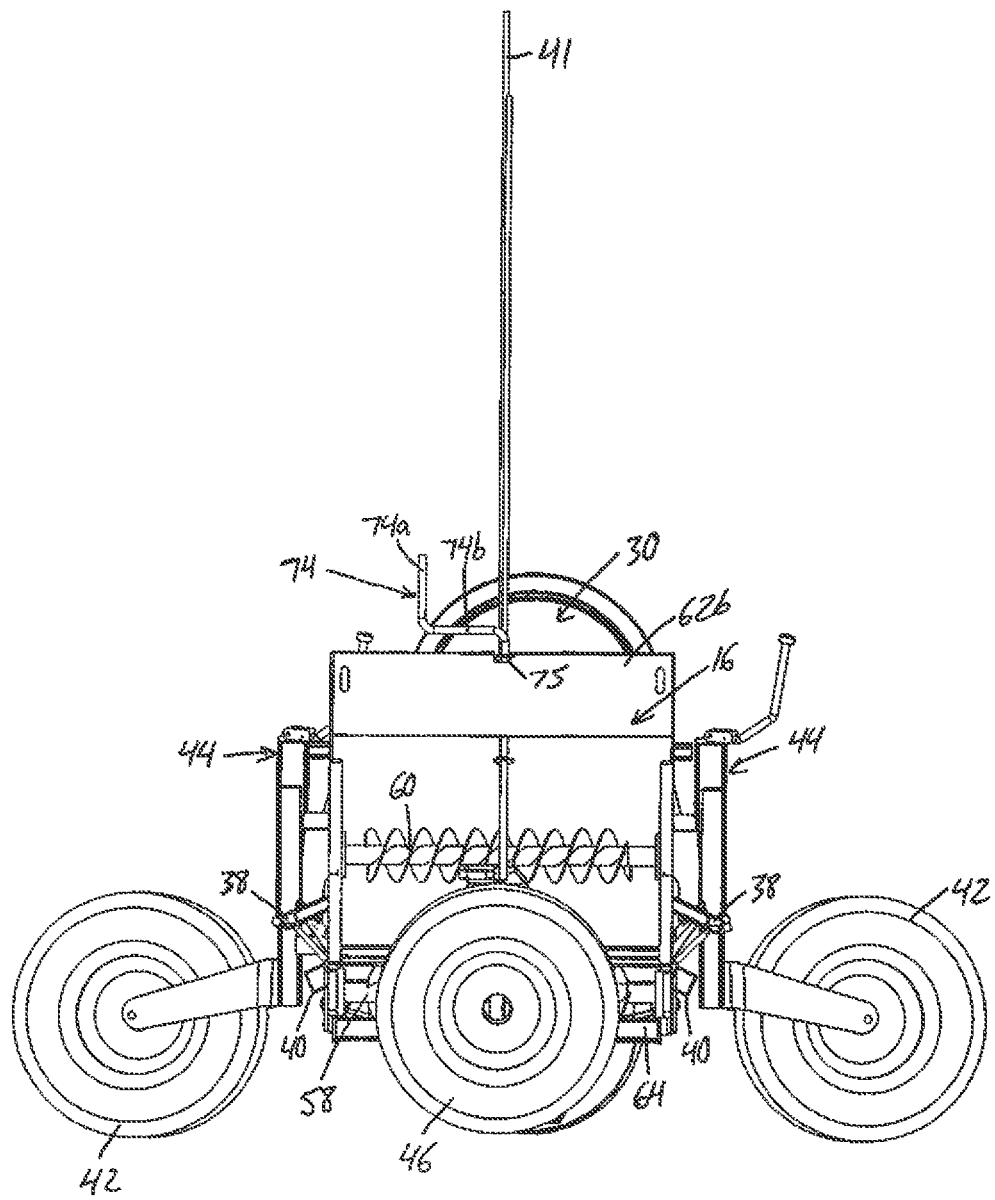
FIG. 6 is a rear elevational view of the drive-over conveyor of FIG. 1.
Figure 7:
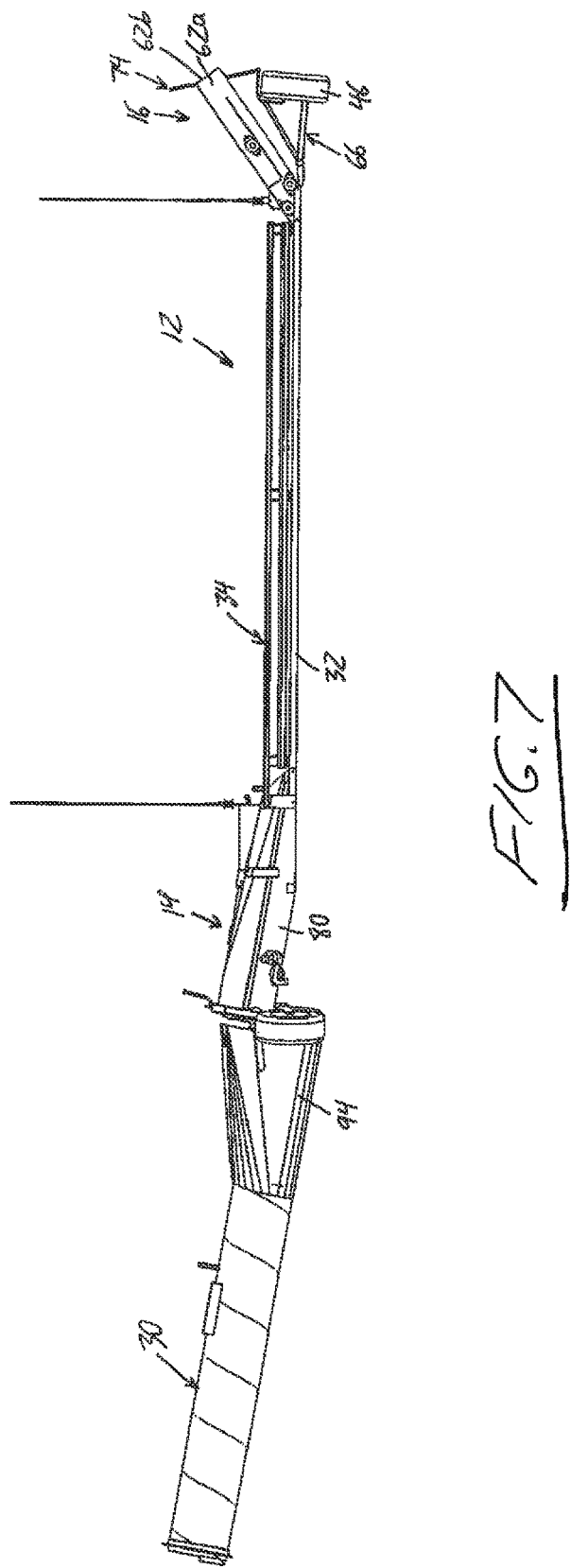
FIG. 7 is a side elevational view of the drive-over conveyor of FIG. 1.

The drawings illustrate a drive-over conveyor 10 installed on the swing tube of a grain auger conventionally used to convey grain into a top opening of a grain storage bin. Aside from its use with the unique drive-over conveyor 10 detailed herein, the grain auger may of conventional structure, and so the remainder of the grain auger is omitted in the illustrate of illustrative efficiency.

The drive-over conveyor consists primary of three interconnected sections: a central loading section 12 having proximal and distal ends 12a, 12b spaced apart in a longitudinal direction denoted by longitudinal axis L, a transition section 14 attached to the central loading section 12 at the proximal end 12a thereof, and a belt-cleanout section 16 attached to the central loading section 12 at the opposing distal end 12b thereof. An overall framework of the drive-over conveyor features a low-profile frame of the central loading section 12 that lies in a generally horizontal plane, plus a respective pair obliquely inclined frames that belong to the transition and belt-cleanout sections 14, 16 and slope upwardly and longitudinally outward from the respective ends of the central loading section 12.

A belt conveyor features a belt 18 entrained in a closed loop about a set of rollers that are rotatably supported on the framework in positions lying horizontally and perpendicularly transverse to the longitudinal direction. The belt, shown using a thick bold line in the cross-sectional view of FIG. 11, spans a substantially full length of the drive-over conveyor 10, occupying the full length of the central loading section 12, and reaching therefrom into both the transition section 14 and the belt-cleanout section 16. A top run of the belt 20 has a central area 20a spanning the longitudinal direction of the central loading section 12 in the generally horizontal plane thereof, an inclined transition area 20b reaching obliquely upward from the central area 20a at the proximal end 12a of the central loading section 12 to a proximal end 18a of the belt's closed loop path near the top of the inclined transition section 14, and an inclined cleanout area 20c reaching obliquely upward from the central area 20a at the distal end 12b of the central loading section 12 to a distal end 18b of the belt's closed loop path near the top of the inclined belt-cleanout section 16. The belt 18 is driven in a predetermined direction conveying its top run toward the proximal end of the belt's closed loop path. as denoted by arrow 19 in FIG. 11.

At the proximal end of the transition section 14 opposite the central loading section 12, the drive-over conveyor is attached to the inlet hopper of the grain auger's swing tube 30. In a known manner, the swing tube 30 is connected to the primary tube of the grain auger for pivotal movement of the swing tube 30 about an upright axis to adjust an azimuth angle of the swing tube relative to the primary tube of the grain auger. The swing tube 30 contains a feed auger 31 which conveys grain into an inlet opening in the topside of the grain auger's primary tube, in which a main auger then conveys the grain upwardly along an obliquely inclined path of the primary housing to a downwardly facing discharge spout that pours the conveyed grain into the top opening of a grain storage bin or other elevated target destination of the grain. As described in greater detail below, the central loading section of the drive-over conveyor is placed below the belly dump outlet of a grain truck or trailer, whereupon opening of the belly dump outlet releases grain from the truck or trailer onto the central area 20a of the conveyor belt's top run 20, and so driven operation of the belt in the predetermined direction 19 feeds the received grain onwardly through the transition section 14, and off the proximal end 18a of the belt's closed loop path into the inlet hopper of the grain auger's swing tube 30, where the feed auger elevates the grain up into the inlet of the grain auger's primary tube for further conveyance up to the target destination.

The frame of the central loading section 12 features two longitudinal side beams 32 disposed on opposite sides of the belt 18 in parallel relation to the longitudinal axis L. In the illustrated embodiment, each longitudinal side beam 32 consists of two parallel flat bars 32a, 32b lying in slightly spaced horizontal relation to one another in an edge-up, face out orientation. That is, the two primary faces of each bar reside in vertically upright planes facing laterally outward from one another, while the two elongated edges of the bar face upwardly and downwardly, whereby the thickness dimension of the bar is measured horizontally thereacross, the larger width dimension of the bar is measured vertically thereacross, and the even larger elongated length of the bar is measured in the longitudinal direction. Each flat bar is made of spring steel or other resiliently flexible material. Accordingly, each bar can be temporarily deflected into a downwardly flexed state by a weight load exerted thereon from above, but will resiliently return to its default unflexed state spanning linearly between the proximal and distal ends 12a, 12b of the central loading section 12.

A pair of movable hopper side walls 34 are each respectively mounted on the two longitudinal beams 32 in a manner pivotal about axis lying parallel thereto at the topside thereof. The drawings show a skeletal structure of each hopper side wall, featuring a set of three pivot legs 36 each pivotally pinned to the respective beam at the topside thereof at spaced positions therealong, a footer rail 38 longitudinally joining the pivot legs 36 at the free outer ends thereof opposite the pivotally hinged inner ends, and an intermediate reinforcement rail 40 lying parallel to the footer rail 38 at an intermediate location between the inner and outer ends of the pivot legs. The three pivot legs 36 of each hopper side wall 34 are equally spaced over the length of the central loading section, which is spanned in near entirety by the hopper wall rails 38, 40. As shown, each footer rail may feature shorter toe bars 39 affixed in parallel relation thereto at spaced positions along the footer rail, for example two such toe bars 39 spaced apart by a distance approximating the tire spacing between the tires on opposing sides of an expected grain truck or trailer, or other bottom-discharge vehicle.

Figure 8:
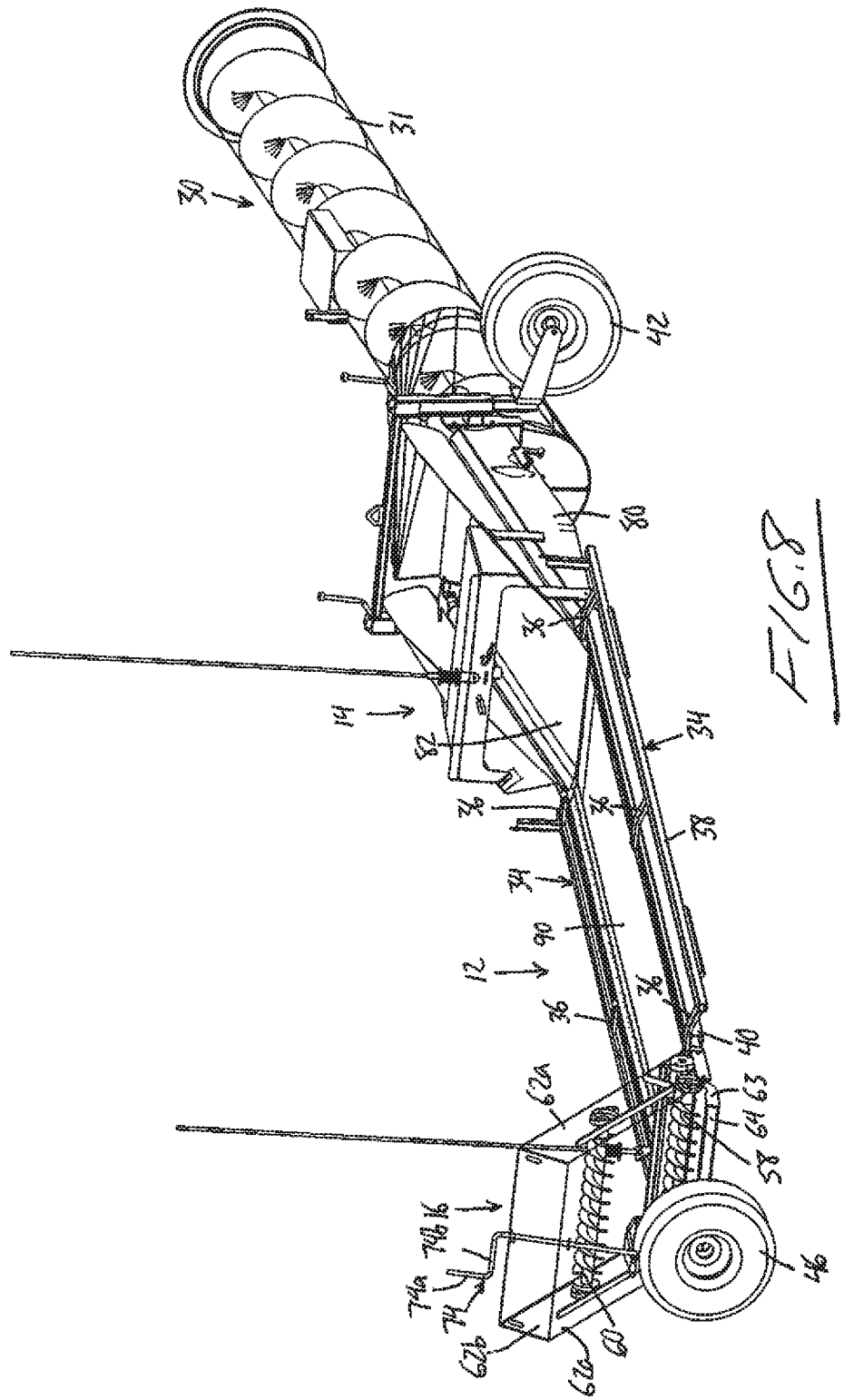
FIG. 8 is a rear side perspective view of the drive-over conveyor of FIG. 1, but in a drive-over state with the hopper side walls in a lowered position, with housings of a belt-cleanout section and auger swing tube shown in transparency for illustrative purpose.
Figure 9:
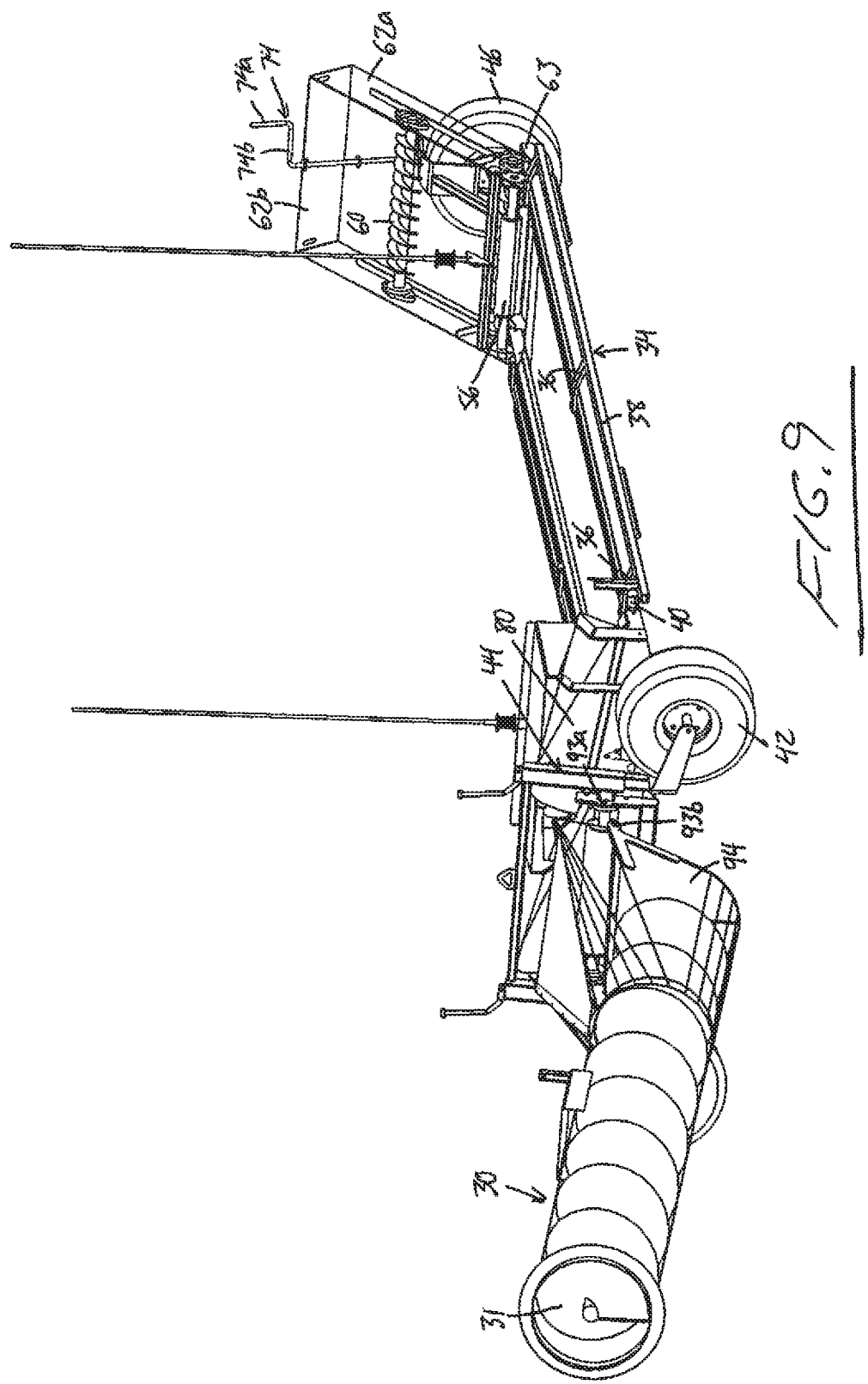
FIG. 9 is a front side perspective view of the drive-over conveyor of FIG. 8.
Figure 10:
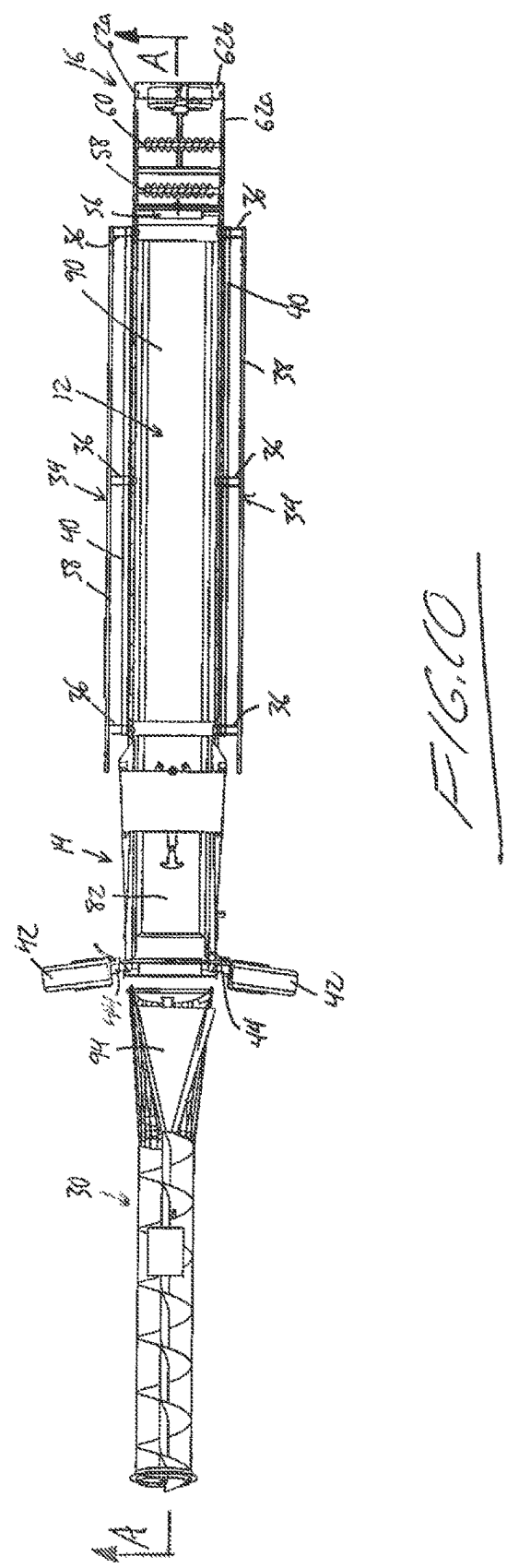
FIG. 10 is an overhead plan view of the drive-over conveyor of FIG. 8.

FIGS. 1 through 7 show the hopper side walls 34 in raised positions standing obliquely upright from the loading section's longitudinal beams 32 in a manner diverging upwardly away from one another to define a loading hopper whose floor is defined by the belt conveyor of the loading section, while FIGS. 8 through 10 show the hopper side walls 34 in lowered positions reaching laterally outward from atop the longitudinal beams 32 and angling down toward the ground to place the footer rails or optional toe bars 39 in contact or close proximity therewith. The skeletal structures of the hopper walls 34 are equipped with rubber belting or other covering material (not shown) on the inner/top sides thereof that face toward one another in the raised positions, and face upwardly away from the ground in the lowered positions. In the lowered positions, this covering defines sloped upper surfaces of the hopper walls over which the wheels of the grain truck or trailer can be driven to transition up onto and down from the flexible longitudinal beams 32 to traverse across the central loading section 12 of the drive-over conveyor. In the raised positions of the hopper walls, the covering defines upwardly divergent guide walls for preventing the grain being dumped from the grain truck or trailer from spilling laterally beyond the central area of the conveyor belt's top run, whereby these raised guide walls cooperate with the belt equipped area between the longitudinal beams 32 to define a hopper for catching the grain from the grain truck or trailer.

One option for controlling raising and lowering of the hopper walls 34 is the use of a control cable 41 situated at or near the proximal end of the central loading section 12. The control cable 41 has a bifurcated lower end, the two branches of which are respectively connected to a pair of standoffs 41a that project from the inner/top sides of the hopper walls, whereby upward lifting of the control cable into a tensioned state lifts the hopper walls into their raised positions until subsequent release of the tensioned state allows gravitational return of the hopper walls to their lowered positions.

A first pair of ground wheels 42 are rotatably supported on a pair of telescopically height-adjustable wheel mounts 44 situated on opposite sides of the transition section 14 at the proximal end thereof that connects to the swing tube 30, and thus are referred to herein as proximal ground wheels 42. The rotational axis of each proximal ground wheel 42 is angularly offset from the longitudinal axis L by a small angle, and is symmetrically disposed across the longitudinal axis L from the rotational axis of the other proximal ground wheel, such that the rotational axes of these two proximal ground wheels converge toward and intersect at the upright pivot axis of the swing tube 30.

An additional ground wheel 46 is rotatably supported on a pivotally height-adjustable wheel mount 48 beneath the frame of the inclined belt-cleanout section 16 so as to reside a short distance beyond the distal end 12b of the central loading section 12, and thus is referred to herein a distal ground wheel. The rotational axis of the distal ground wheel 46 is parallel to the longitudinal axis L, and bisects the angle of convergence between the rotational axes of the proximal ground wheels 42. Accordingly, the rotational axis of each ground wheel 42, 46 lies radially of the upright pivot axis of the swing tube 30 so that the wheels allow smooth swinging motion of the swing tube and attached drive-over conveyor in an arc-shaped path about the swing tube's pivot axis.

While the height-adjustable mounts 44, 48 of the three ground wheels 42, 46 enable adjustment of the height at which the central loading section 12 is carried between the proximal ground wheels 42 and the distal ground wheel 46, this height adjustment is not relied upon to raise and lower the frame of the central loading section into and out of contact with the ground when transitioning the drive-over conveyor between different useful positions. Instead, the ground wheel height adjustment is normally used only to ensure that the suspended height of the loading section between the two sets of ground wheels is sufficient to enable clearance of any variation in ground terrain at the current site of use. After this one-time height adjustment during initial setup, no further lifting or lowering of the central loading section is required to reposition the drive-over conveyor during use.

The hopper walls 34 are lowered, and the grain truck or trailer is driven up to the central loading section 12 from one side thereof, where the respective one of the lowered hopper walls 34 angles downwardly toward the ground from the low-profile longitudinal beams 32, which are only very slightly elevated above the ground. The vehicle tires can therefore easily ride up onto the covered upper surface of the lowered hopper wall 34, and drive over the respective longitudinal beam 32, during which the weight of the vehicle flexes the longitudinal beam 32 downwardly into contact with the underlying ground surface. The vehicle continues onward, rolling its wheels over the center belt area 20a, and then over the second longitudinal beam 32, which likewise flexes downwardly to the ground under the vehicle weight. As the vehicle clears each longitudinal beam 32, the resilient spring steel thereof returns the beam 32 to its default state, causing the respective side of the central loading section to spring back up off the ground. With the front wheels of the vehicle having cleared the central loading section 12 in this manner, the vehicle continues forwardly until a bottom-discharge outlet thereof aligns generally over the central belt area 20a of the drive-over conveyor. At this point, fine tuning of the alignment of the conveyor's unloading section beneath the vehicle outlet may be performed by the simple arcuate swinging of the conveyor about the swing tube pivot axis, without first requiring any lifting of the central conveyor section, since its flexible spring steel frame already resides in spaced elevation off the ground due to its self-lifting spring-return action once the vehicle weight is removed therefrom.

With the center loading section 12 aligned beneath an outlet of the grain truck or trailer, the hopper walls 34 are raised, the conveyor belt is activated, and the outlet of the grain truck or trailer is opened to dump the contents thereof onto the belt 18. In the case of a multi-compartment grain truck or trailer with multiple outlets, once the first compartment has been emptied onto the belt conveyor, the conveyor can then be swung over to the outlet of the vehicle's next bottom-discharge compartment, again without needing to perform any lifting action to raise the central loading section off the ground.

The disclosed invention thus differs notably from the prior art in that the loading section's frame is never parked into actual seated contact on the ground, and instead always resides in a slightly elevated position above the ground, and only momentarily deflects toward the ground in a self-squatting action when driven over, before self-springing back up into its naturally elevated position. Accordingly, where drive-over conveyors of the prior art employed a single step park-and-sit placement of the loading section in a stationary position seated on the ground, and thus relied on manoeuvring of the vehicle relative to the drive-over conveyor to change the particular vehicle outlet aligned over the conveyor's loading section, the disclosed invention instead uses a multi-position park-and-swing process to move the loading section from one parked position beneath a first outlet of a parked stationary vehicle to another position below a second outlet of the parked stationary vehicle. No lifting of the loading section is required during such transition from one parked position to another. Instead, simple wheel based rolling is the only action required to swing the unit from one wheel supported, slightly-elevated, parked working position to another.

Figure 11:
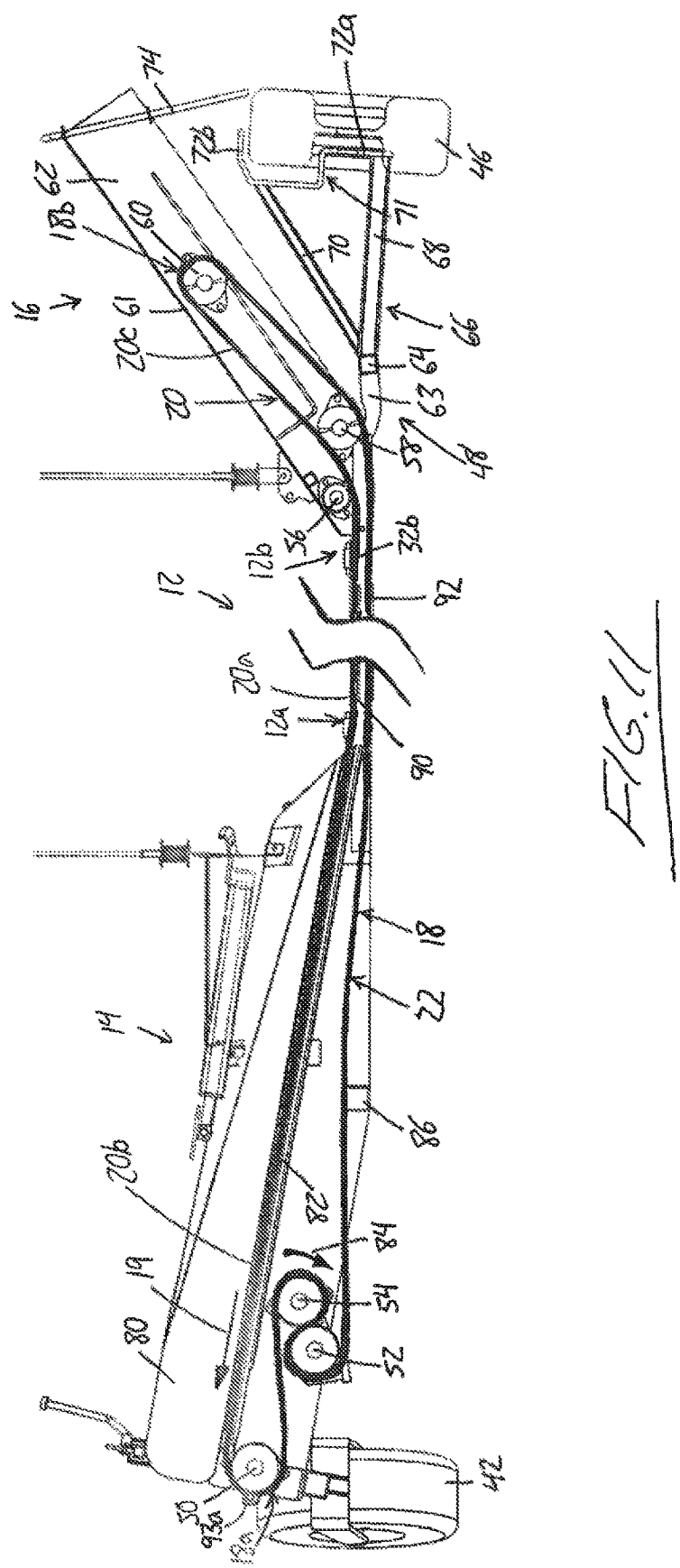
FIG. 11 is a partial cross-sectional view of the drive-over conveyor of FIG. 10 as taken along line A-A thereof, but with the auger swing tube omitted and the belt of the conveyor included to illustrate the routing thereof through different sections of the conveyor.

With reference to the cross-section of FIG. 11, the rollers around which the belt is entrained includes a set of three cylindrical rollers 50, 52, 54 at the transition section 14, and at the belt-cleanout section 16, one cylindrical guide roller 56 and two auger-shaped rollers 58, 60. The frame of the belt-cleanout section 16 features two side walls 62, each of which is affixed to the outer flat bar 32a of a respective one of the longitudinal beams 32 of the central loading section and angles obliquely upward therefrom in a vertical plane. The two identical side walls 62a are perpendicularly interconnected at their upper ends by an end wall 62b, resulting in a boxlike frame structure for the cleanout section 16. A rectangular cover panel 61 is fitted atop the side and end walls 62a, 62b of this boxlike frame, and therefore resides in an inclined plane angling upwardly from the central loading section 12 in a manner covering off the space delimited by the cleanout section's boxlike frame. The guide roller 56 and auger-shaped rollers 58, 60 span perpendicularly between the two inclined side walls 62*a* of the cleanout section 16, and are rotatably supported thereon by suitable bearings affixed thereto. The guide roller 56 resides just over the longitudinal beams 32 of the central loading section where the distal end 12*b* thereof meets with the lower ends of the cleanout section side walls 62*a*. The first auger-shaped roller 58 of the cleanout section resides at similar elevation to the guide roller 56 near the bottom end of the side walls 62*a*, just beyond the end of the central cleanout section. The other auger-shaped roller 60 resides at a greater elevation further up the inclined side walls 62*a* and nearer to the end wall 62*b* of the cleanout section.

With continued reference to FIG. 11, the top run 20 of the belt reaches under the guide roller 56 from the central cleanout section 12, and then runs overtop the lower auger-shaped roller 58 and angles upwardly therefrom to the topside of the upper auger-shaped roller 60, where the belt then wraps around this roller 60 to the underside thereof, thus denoting the distal end 18*b* of the belt's closed-loop path where the belt 18 changes directions back toward the central loading section 12. The bottom run 22 of the belt angles downwardly from this wrapped engagement about the upper auger-shaped roller 60 to the underside of the lower auger-shaped roller 58, from which the bottom run 22 of the belt reaches longitudinally back into the central loading section 12. Here, the lower run 22 of the belt 18 continues onward through the central section 12 to the transition section 14 at the opposing proximal end 12*a* of the central loading section 12.

The underside of the cleanout section's boxlike frame lacks a matching cover to that found at the topside of the boxlike frame, whereby the cleanout section is only partially enclosed, and leaves an open bottom space through which material from the auger-shaped rollers can fall. Each auger-shaped roller 58, 60 features a central shaft from which auger fighting radiates outwardly in a helical path therearound over a majority of the shaft's length between the side walls 62*a* of the boxlike frame. However, the helical flighting terminates short of each side wall 62*a* in order to leave a gap between the respective end of the auger flighting and the adjacent side wall 62*a* of the boxlike frame of the cleanout section 16.

The belt engages around each auger-shaped roller at the outer peripheral edge of the auger flighting, and the width of the belt is equal or slightly less than to the axial length of the auger fighting so that at least a majority of the fighting is covered by the belt. However, part of the auger flighting at each end may reach beyond the respective side of the belt 18. Since the driven direction of the belt 18 causes the top run 20 to move into the transition section 14 at the proximal end 12*a* of the central loading section, this means that the bottom run 22 of the belt 18 moves in the opposing direction and into the belt-cleanout section 16 at the distal end 12*b* of the central loading section. Accordingly, any grain or other debris that falls from the top run of the belt and ends up within the space between the top and bottom runs 20, 22 of the belt 18 will be conveyed atop the belt's bottom run into the cleanout section 16, where instead of becoming crushed between the cylindrical periphery of a conventional drum-shaped roller, this debris will be conveyed transversely outward from the space between the belt runs by the rotary action of the two auger-shaped rollers 58, 60. Since the cleanout section has an open-bottomed frame or housing, the cleared debris from the auger-shaped rollers is free to fall to the ground, and thus does not become entrapped within the machine.

This avoids crushing and buildup of fallen grain or other debris on any of the rollers to improve the operating performance of the belt conveyor and reduce required service and maintenance. It will be appreciated that this unique use of one or more augers within a belt conveyor's set of rollers to provide a cleanout action of the belt space may be used in any belt conveyor setting, and therefore is not limited to the particular drive-over conveyor context described herein. By having one of the auger-shaped rollers 58 situated near the bottom of an inclined belt section whose bottom run is travelling upward, loose material on the bottom run of the belt is gravitationally encouraged to remain at the bottom of the inclined area until the lower auger 58 has fully conveyed the material outwardly off the respective side edge of the belt's bottom run. However, it will be appreciated that even if not used at an inclined belt area, an auger-shaped roller may still provide some degree of cleanout action, and thus present a novel and inventive improvement over conventional belt conveyor design.

In the illustrated context of a drive-over conveyor, the inclined state of the belt cleanout section not only improves the effectiveness of the auger-based cleanout action, but leaves an open space between the inclined boxlike frame to accommodate the respective ground wheel 46 situated at this distal end of the machine, whereby the distal end ground wheel doesn't increase the overall machine length.

In the illustrated example, the height adjustable mount 48 for this wheel features a pair of brackets 63 each reaching longitudinally from the distal end of a respective one of the longitudinal beams 32, and a cross-bar 64 spanning transversely between the two brackets 63. The brackets 63 are pivotally pinned to the respective longitudinal beams 32 for pivoting upward and downward relative thereto about a horizontal axis lying perpendicularly transverse to the longitudinal direction. The mount additionally features a triangular wheel support 66 residing in a vertical plane that is centered between the longitudinal beams 32 and contains the longitudinal axis L. The wheel support 66 features a bottom arm 68 reaching longitudinally from the cross-bar 64, and a sloped top arm 70 angling obliquely upward therefrom. An upright end unit 71 of the wheel support 66 spans between the distal ends of the arms 68, 70 of the wheel support to complete the triangular shape thereof, and defines both a wheel hub 72*a* to which the ground wheel is rotatably mounted, and a connection bracket 72*b* reaching over the wheel 46 to receive the bottom end of an upright wheel height adjustment handle 74.

The adjustment handle 74 has a lower end hinged to the connection bracket 72 to allow relative pivoting therebetween about a hinge axis parallel to the pivot axis of the brackets 63, and then reaches upwardly through a hole in the top cover of the boxlike frame of the cleanout section 16 near the end wall 62*b* thereof. The handle 74 has an externally threaded portion engaged through an internally threaded nut, collar or hole 75 on the boxlike frame, whereby rotation of the handle 74 about its upright axis in opposing directions raises and lowers the connection bracket 72*b* in order to lift and lower the ground wheel, thereby lowering or raising the distal end 12*b* of the central loading section 12 and the belt-cleanout section 16 that is affixed thereto. It will be appreciated that this is just one example of a height-adjustable wheel mount design that may be used to adjust the height of the machine at its distal end, and other designs, whether hand driven or powered (e.g. using one or more hydraulic or electric actuators), may alternatively be used.

Above the cleanout section 16, the handle features an offset grip 74a at its top end that is radially offset from the bracket-connected main shaft of the handle by a crank arm 74b to enable easy manual rotation of the handle. Since the flexible drive-over loading section 12 requires no foldable ramps at its distal end and never needs to be fully lowered into a ground-seated position, and since the inclined cleanout-section leaves a wheel accommodating space beneath it, the pivotally adjusted wheel mount is preferably permanently pinned to the central loading section, and not intended for user removal or reattachment, thought the ground wheel itself may be removable to enable replacement when worn or damaged.

The frame of the transition section 14 features a pair of inclined side walls 80 respectively connected to the longitudinal beams 32 of the central loading section to slope upwardly and longitudinally therefrom in respective vertical planes, similar to the side walls 62a of the cleanout section 16, but at a less steep angle to the planar central loading section 12. The three cylindrical rollers 50, 52, 54 of the transition section are rotatably supported between the side walls 80 via suitable bearings mounted thereon, also like the rollers 56, 58, 60 in the cleanout section 16. The three rollers 50, 52, 54 of the transition section include an isolated end roller 50 near the upper ends of the inclined side walls 80, and a pair of adjacent rollers 52, 54 situated at lesser elevation than the end roller 50 at a distance spaced downwardly therefrom toward the central loading section 12. The shaft of one of these adjacent rollers 54 features a keyed end 54a that reaches outwardly through the respective side wall 80 of the transition section 14 for connection to a suitable rotational drive source, for example a hydraulic or electric motor. The inclined transition area 20b of the belt's top run slopes longitudinally and upwardly from the central loading section 12 over a floor plate 82 of the transition section that spans between the side walls 80 at an angle of matching inclination thereto from near the proximal end 12a of the central loading section 12 to a point just above a top rear quadrant of the isolated end roller 50. From here, the belt wraps around the two front quadrants of the isolated end roller 50 to mark the respective proximal end 18a of the belt's closed loop path, where the belt changes direction so that the bottom run reaches back toward the central loading section.

The bottom run of the belt reaches past the lower one 52 of the adjacent rollers 52, 54 and onto the upper one 54 of these adjacent rollers, which in the illustrated example is the driven roller of the belt conveyor with the keyed drive end 54a. At this upper roller 54, the bottom run 22 of the belt 18 then wraps around the rear quadrants thereof to momentarily change direction and follow a serpentine path upwardly through a nip space defined between these closely adjacent rollers 52, 54. From the roller nip, the bottom run of the belt then wraps around the front quadrants of the lower roller 52 to once again change direction and reach longitudinally toward the central loading section 12. The terms front, forward and proximal are used in relation to a direction approaching the grain auger, while the terms rear, rearward and distal and used to represent the opposite direction moving away from the grain auger.

Clockwise arrow 84 in FIG. 11 denotes the motor driven direction of the upper roller 54, by which the belt is entrained in the predetermined direction 19. The bottom run of the belt reaches longitudinally rearward from the underside of the lower roller 52, passing under the upper roller 54 and over a belt-guiding cross-beam member 86 that lies perpendicularly between the two sides walls 80 at the bottom edges thereof at an intermediate location between the pair of adjacent rollers 52, 54 and the proximal end 12a of the central loading section 12.

The central loading section 12 features upper and lower belt pans 90, 92, which run along the longitudinal beams 32 at the top and bottom edges thereof respectively and span between the two beams 32 over nearly the full lengths thereof. The top run of the belt spans over the upper pan 90, while the bottom run of the belt spans over the lower belt floor pan 92. The belt pans are thin metal sheets which can flex with the longitudinal beams when the central loading section is driven over. The belt floor pans may be bolted to one another at each of the beams in the open space between the two flat-bars of the beam. The central loading section is entirely free of any belt rollers in order to maintain the low profile, resiliently flexible structure of the central loading section's frame, while the belt pans provide support for the top and bottom runs of the belt as they move through the central loading section and prevent rubbing contact between the oppositely moving belt runs, and between the bottom belt run and the ground.

The swing tube 30 of the grain auger is pivotally coupled to the transition section 14 for pivotal movement therebetween about a horizontal pivot axis lying perpendicularly transverse to the longitudinal direction, for example via pivot pins fitted through aligned lug ears 93a, 93b at the proximal end of the transition section and the swing tube's inlet hopper 94 at the distal end thereof. This pivotal connection accommodates varying elevation angles of the grain auger and its swing tube 30 relative to the ground on which the drive-over conveyor 10 is supported by its ground wheels 42, 46. As an alternative to the described inclusion of a pinned pivotal connection between the transition section and the swing tube of the main auger, a pivotal connection may instead be provided between the transition section and the central loading section to accommodate different inclination angles of the main auger.

The proximal end 18a of the belt 18 stops just short of the distal end of the inlet hopper 94, in which an inlet opening is defined to accept the conveyed grain from the top run 20 of the belt 18. The grain introduced to the inlet hopper is then conveyed onward by the feed auger 31 of the swing tube 30 into the primary tube, where the grain auger's main auger conveys the grain upward to its target destination.

Each telescopically adjustable wheel mount 44 of the two proximal end ground wheels 42 features an outer tube 44a affixed to the outer side of a respective side wall 80 of the transition section at the proximal end thereof, and an inner tube 44b telescopically projecting from the bottom of the outer tube to carry the respective ground wheel 42 via a respective fork 95. A respective crank handle 96 situated atop the outer tube 44a of each telescopic wheel mount is coupled to an actuator shaft that reaches down into the outer tube 44a, where it has a male threaded portion engaged with a female threaded feature of the inner tube 44b so that rotation of the actuator shaft in opposite directions via the crank handle 96 raises or lowers the inner tube relative to the outer tube, thus raising or lowering the attached wheel 42 in order to lower or raise the proximal end 12a of the central loading section and the transition section 14 affixed thereto. Like with the distal ground wheel 46, this manually operated telescopic wheel mount structure is only one example of possible height adjustable wheel mount styles that may be used.

As mentioned above, the primary intention of the height adjustability at both ends of the machine is to ensure establishment of a suitable working height to clear any variation in ground terrain at the intended site of use, but use of the machine once set to such a suitable working height requires no further height adjustment to move between different parked working positions, as the flexible frame of the central loading section self-squats and self-returns as the vehicle drives over same, thus avoiding need for any powered or manual lifting or lowering actions during use.

While the illustrated embodiment is described in terms of unloading a grain truck or trailer and feeding of the unloaded grain into an attached grain auger that fills a grain storage bin through a top opening thereof, it will be appreciated that the benefits of the described flexible drive-over frame regardless of the particular type of bottom-discharge vehicle being unloaded; the particular type of granular material being unloaded; regardless of a particular type of secondary conveyor (e.g. screw auger, belt conveyor, inclined or otherwise) to which the granular material is conveyed by the drive-over unit; regardless of whether such a secondary auger or conveyor is attached to the drive-over unit or not, or even used at all; and regardless of the particular type, location and elevation of the target destination of the unloaded material.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A drive-over conveyor belt system comprising:
    a loading section for receiving material, said loading section having a proximal end and a distal end lying opposite thereto in a longitudinal direction;
    a belt conveyor spanning in the longitudinal direction of the loading section; and
    a set of ground wheels carrying said loading section in an elevated state residing at a spaced working distance above a ground surface over which said ground wheels are movable;
    wherein a frame of the loading section comprises resiliently flexible beams lying in the longitudinal direction on opposing sides of the belt conveyor, said resiliently flexible beams being deflectable downwardly through said working distance into temporary contact with said ground surface, from which said flexible beams are resiliently biased back upwardly into said elevated state.

2. The conveyor belt system of claim 1 wherein the set of ground wheels support said loading section only from the proximal and distal ends thereof.

3. The conveyor belt system of claim 1 wherein said resiliently flexible beams comprise spring steel.

4. The conveyor belt system of claim 1 comprising raisable and lowerable hopper walls pivotal on the loading section between raised positions angling upwardly from opposite sides the belt conveyor at the loading section in a diverging manner, and lowered positions sloping downwardly from the opposite sides of the belt conveyor toward ground level.

5. The conveyor belt system of claim 4 wherein the loading section is free of any drive-over ramps other than sloped upper surfaces of the hopper walls in the lowered position.

6. The conveyor belt system of claim 1 wherein, within the loading section, the belt conveyor is free of any rollers.

7. The conveyor belt system of claim 1 comprising a permanently attached ground wheel mount that is situated proximate the distal end of the loading section and rotatably supports a respective ground wheel that carries said distal end of the loading section.

8. The conveyor belt system of claim 7 wherein the ground wheel carries said distal end of the loading section in the elevated state above ground level at all times.

9. A method of using the conveyor belt system of claim 1 comprising:
    with said conveyor belt system in a parked position suspending the loading section in the elevated state at the working distance above ground level, allowing a bottom-discharge vehicle to drive over the loading section, during which the resiliently flexible beams of the loading section flex downwardly into contact with the ground surface beneath a weight of said bottom-discharge vehicle.

10. The method of claim 9 comprising using a resiliency of the resiliently flexible beams of the loading section to return the loading section to a normal unflexed state spaced above the ground surface once wheels of the bottom-discharge vehicle have cleared said loading section.

11. A method of using a drive-over conveyor comprising:
    with said drive-over conveyor in a parked position suspending a loading section of said drive-over conveyor in an elevated state above a ground surface, allowing a bottom-discharge vehicle to drive over the loading section, during which the loading section flexes resiliently downward into contact with said ground surface beneath a weight of said bottom-discharge vehicle.

12. The method of claim 11 comprising using a resiliency of the loading section to return the loading section to a normal unflexed state spaced above the ground surface once wheels of the bottom-discharge vehicle have cleared said loading section.

* * * * *